Oct. 21, 1924.　　　　　　　　　　　　　　　　1,512,073
T. R. WIWI
ADVERTISING MACHINE
Filed July 19, 1922　　　6 Sheets-Sheet 1
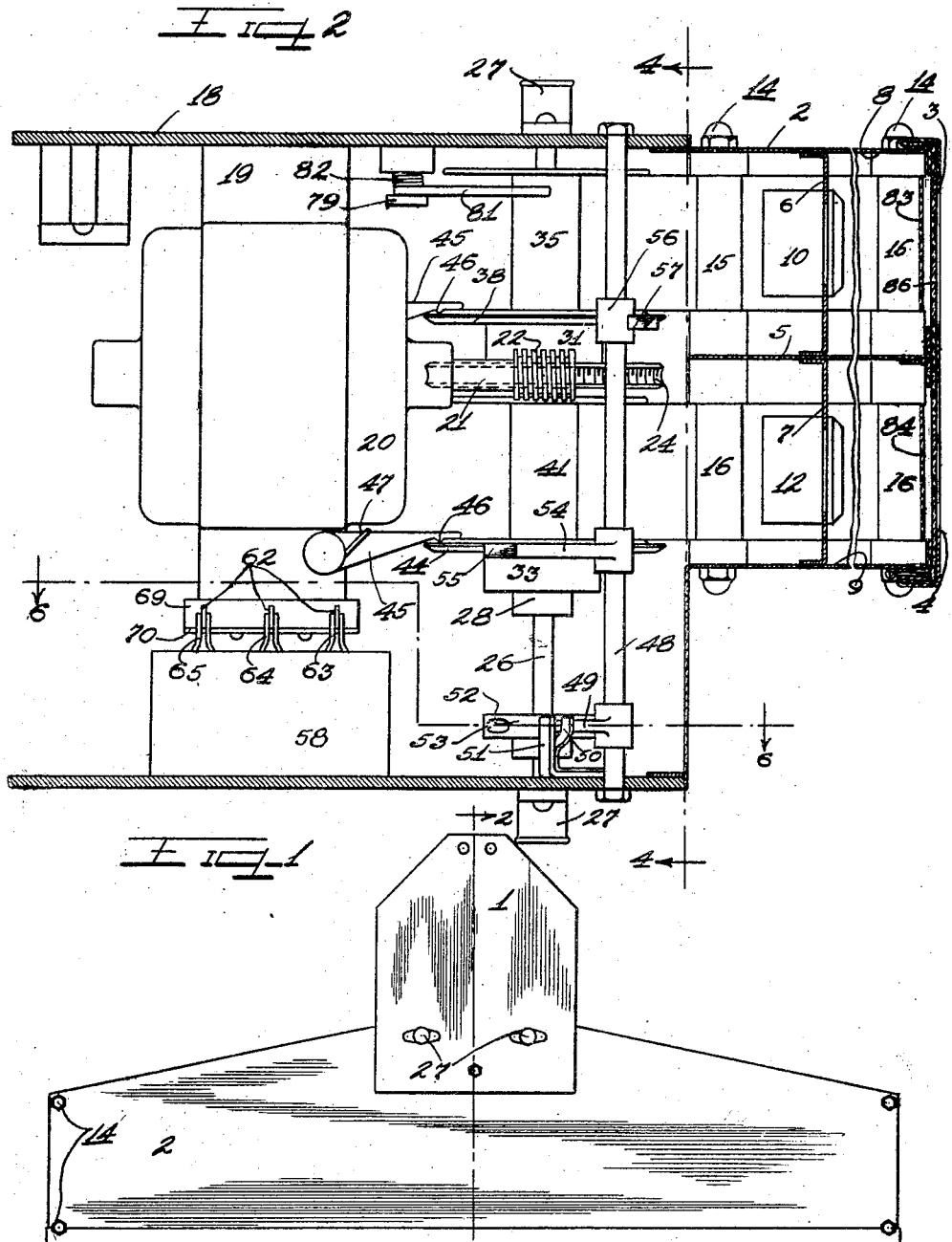

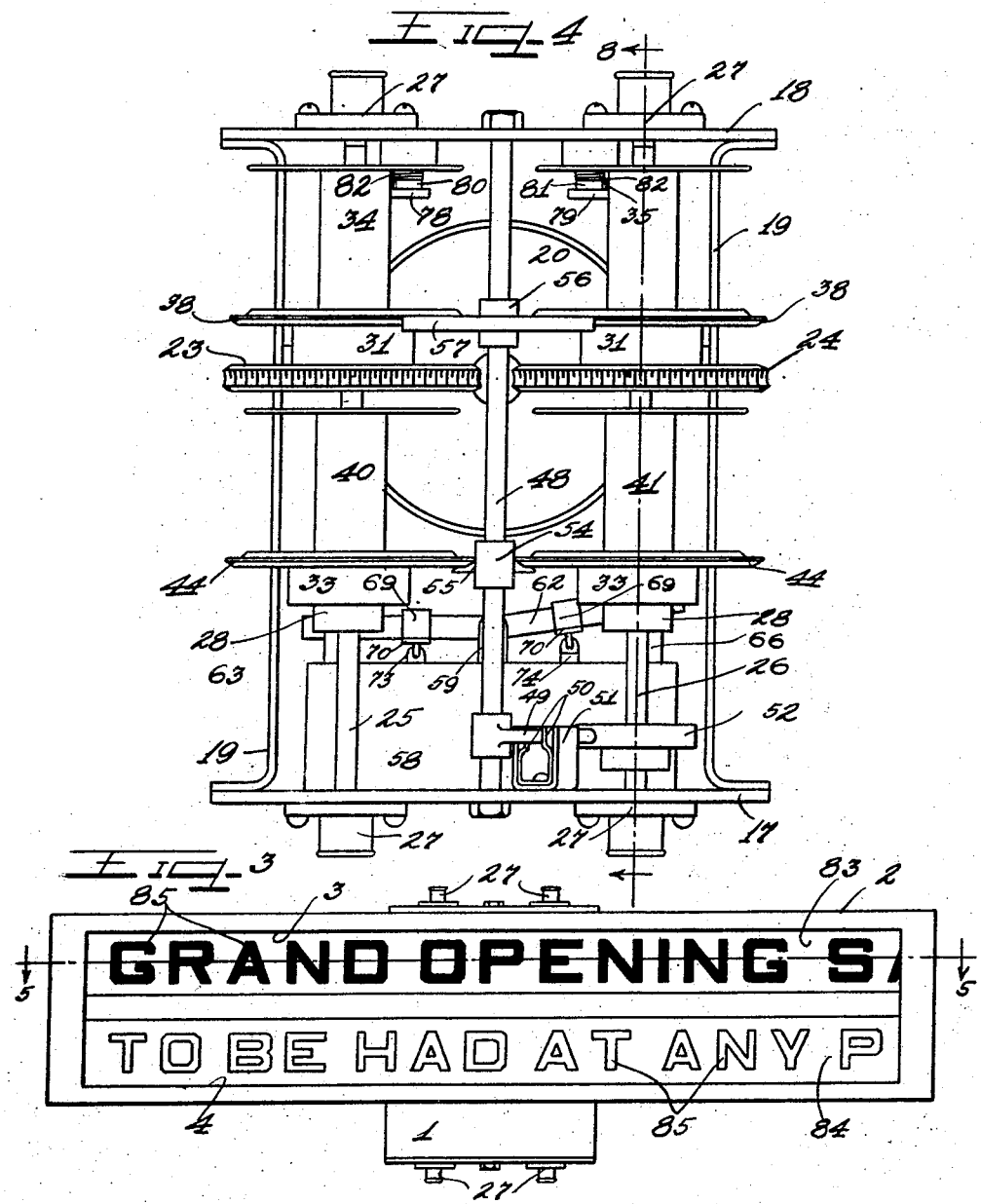

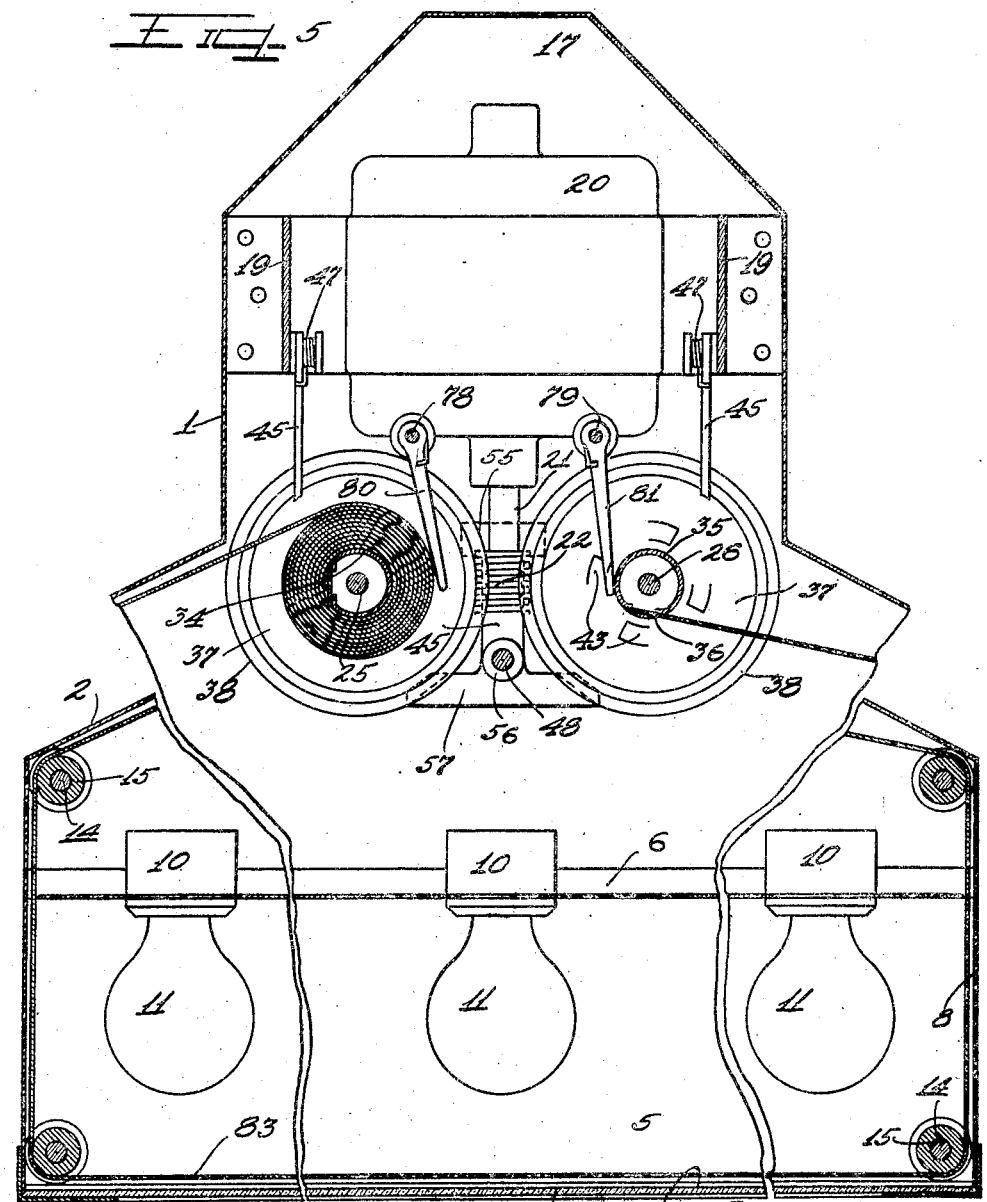

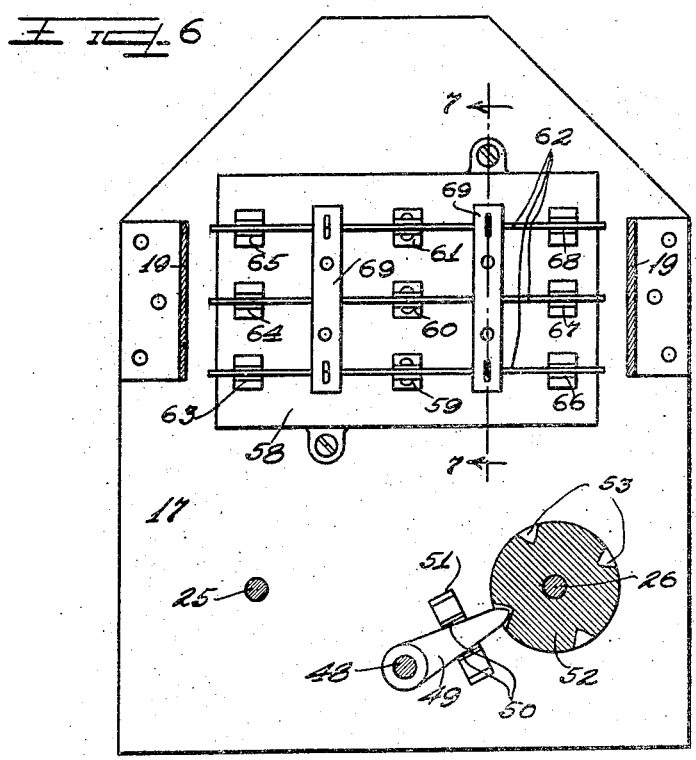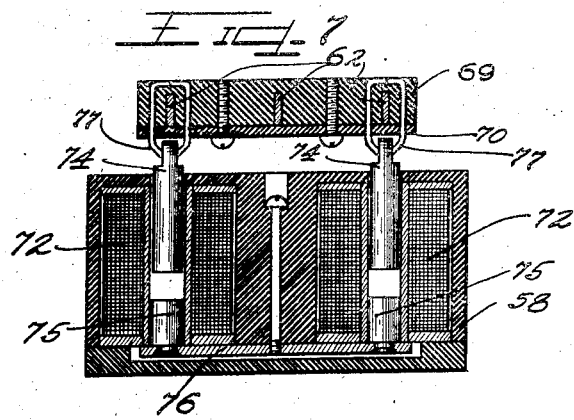

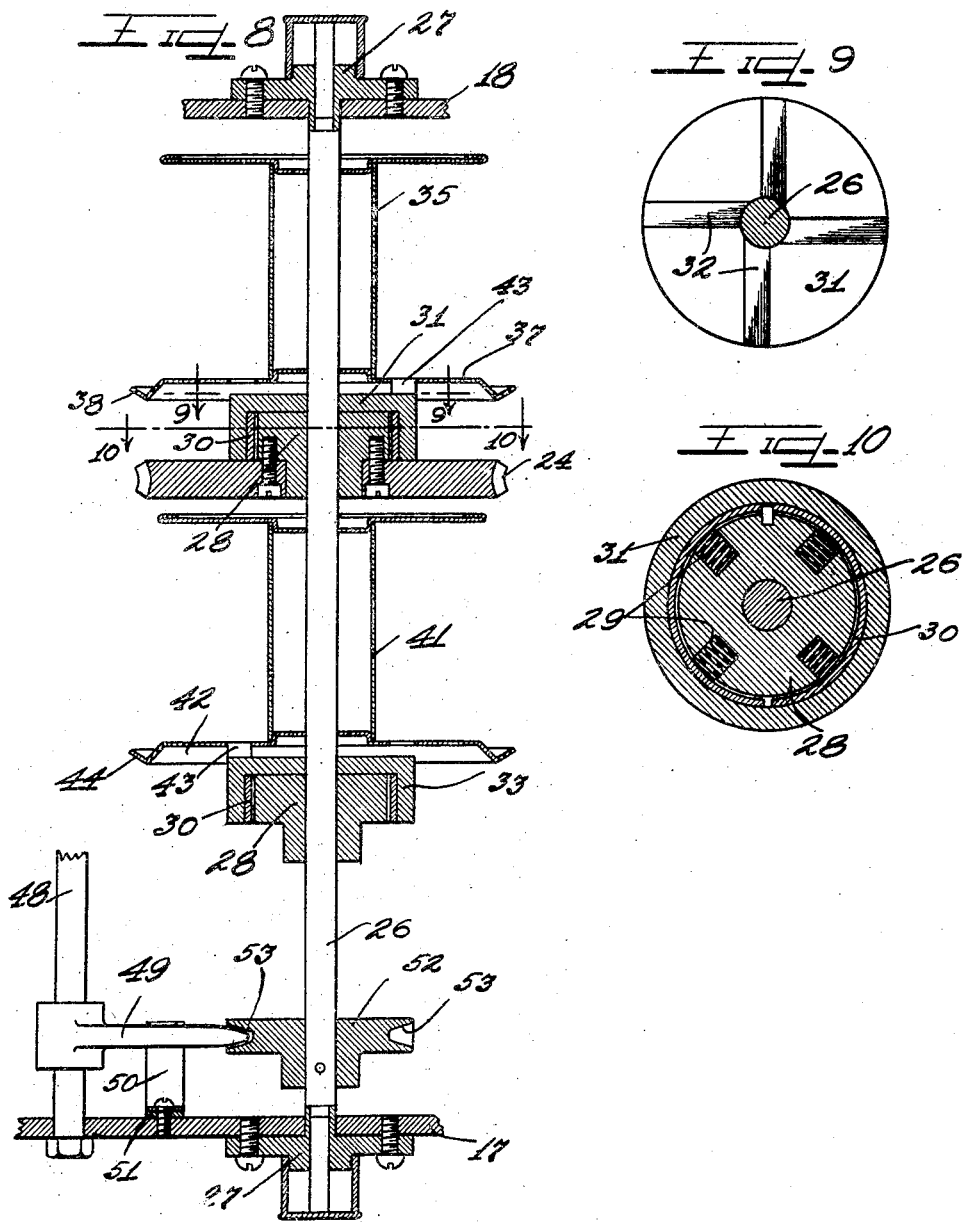

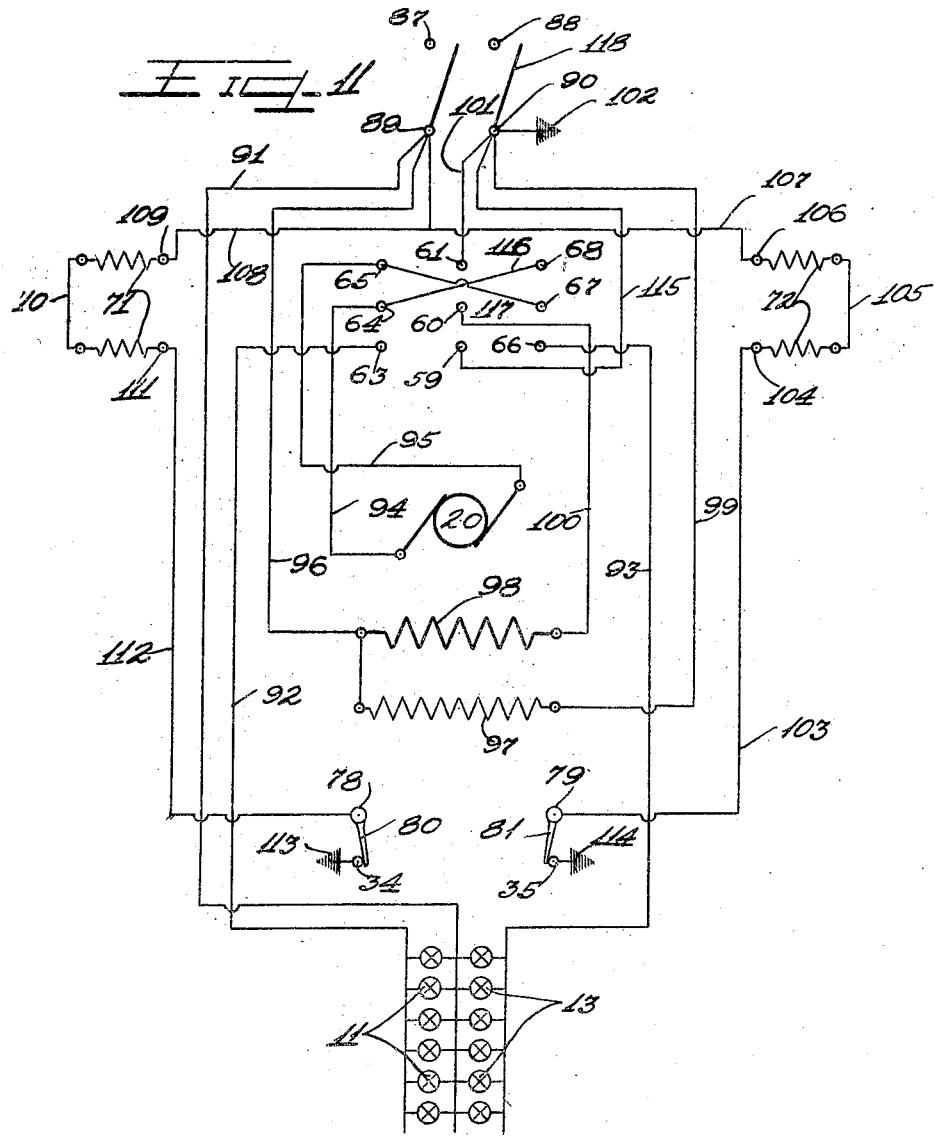

Patented Oct. 21, 1924.

1,512,073

UNITED STATES PATENT OFFICE.

THOMAS R. WIWI, OF CHICAGO, ILLINOIS, ASSIGNOR OF FORTY-FIVE PER CENT TO WILLIAM H. DEAN, OF CHICAGO, ILLINOIS.

ADVERTISING MACHINE.

Application filed July 19, 1922. Serial No. 576,052.

*To all whom it may concern:*

Be it known that I, THOMAS R. WIWI, a citizen of the United States, and a resident of the city of Chicago, in the county of Cook and State of Illinois, have invented certain new and useful Improvements in an Advertising Machine; and I do hereby declare that the following is a full, clear, and exact description of the same, reference being had to the accompanying drawings, and to the numerals of reference marked thereon, which form a part of this specification.

This invention relates to an improved type of an advertising machine similar to that covered in my Patent No. 1,466,327, for an "advertising device", dated August 28, 1923. The machine of this invention is adapted for use in window displays and embraces traveling sign tapes, one of which is illuminated and travels across an advertising space, while the other tape moves without being illuminated in an opposite direction to be rewound ready to be displayed after the first display tape has run its full length and is automatically reversed by the action of a contact mechanism which causes the first tape to be rewound ready for reuse.

It is an object of this invention to provide an improved illuminating device having traveling signs adapted to be repeatedly run across display openings in a sign casing and reversed by means of an automatically acting reel switch mechanism.

It is also an object of the invention to provide an advertising device wherein motor driven reels are adapted to be automatically reversed at predetermined intervals by the action of contact members contacting the reels to close electric circuits at predetermined times to cause advertising ribbons to be advanced across casing openings in front of illuminating means to display words or symbols on said ribbons.

It is a further object of the invention to provide an advertising device having a nonconducting advertising ribbon adapted to hold a contact member out of engagement with the hub of a spool until said ribbon is completely wound from one spool as it is wound upon another by means of a motor adapted to be reversed automatically when the contact member associated with one spool is permitted to contact the spool hub to close an electric circuit whereby a reversing switch is thrown when the end of the advertising ribbon is reached.

Another object of the invention is to provide an advertising device for display windows and the like, said device having a ribbon with words thereon adapted to be illuminated as the ribbon is pulled across a casing opening, said ribbon further adapted to hold an electric contact member out of contact with the spool until the end of the ribbon is reached when the contact member is permitted to close a circuit to cause throwing of a switch whereby a motor is reversed to cause the ribbon to be moved in a reverse direction.

It is furthermore an object of the invention to provide an advertising device with advertising ribbons adapted to be simultaneously moved in opposite directions and controlled by a motor reversing switch mechanism adapted to be operated at predetermined times by a governing device permitted to act when the ends of the ribbons are reached.

Another object of the invention is to provide an advertising device wherein the ribbon carrying spools are adapted to be shifted into and out of engagement with driving clutches at predetermined times depending upon the length of the ribbons which govern the operation of a motor reversing mechanism.

It is an important object of this invention to provide a simple and effective advertising machine adapted for window display advertising and embracing automatic operating mechanisms adapted to automatically reverse a driving motor and cause shifting of the ribbon carrying spools into and out of driving engagement with clutch mechanisms when the ends of the advertising ribbons are reached.

Other and further important objects of this invention will be apparent from the disclosures in the drawings and specification.

The invention (in a preferred form) is illustrated on the drawings and hereinafter more fully described.

On the drawings:

Figure 1 is a top plan view of the advertising machine embodying the principles of this invention.

Figure 2 is an enlarged vertical section taken on line 2—2 of Figure 1 with parts in elevation.

Figure 3 is a front elevation of the advertising machine.

Figure 4 is a view taken on line 4—4 of Figure 2.

Figure 5 is an enlarged horizontal section taken on line 5—5 of Figure 3 with parts in elevation.

Figure 6 is a sectional view taken on line 6—6 of Figure 2.

Figure 7 is an enlarged detail section of the motor reversing switch taken on line 7—7 of Figure 6.

Figure 8 is an enlarged detail section taken on line 8—8 of Figure 4 with parts in elevation and with parts broken away.

Figure 9 is an enlarged detail view taken on line 9—9 of Figure 8.

Figure 10 is an enlarged detail section taken on line 10—10 of Figure 8.

Figure 11 is a wiring diagram of the device.

As shown on the drawings:

The reference numeral 1 indicates a mechanism casing or housing having rigidly secured across the front thereof a display box 2 having long narrow openings 3 and 4 in the front wall thereof one above the other. The box 2 is long and projects beyond the sides of the casing 1 as illustrated in Figures 1 and 3. The box 2 is divided by a horizontal partition 5 and by vertical partitions or walls 6 and 7. The partition 5 divides the interior of the box 2 into an upper chamber 8 and a lower chamber 9. Mounted upon the front surface of the wall 6 is a plurality of electric light sockets 10 having electric light bulbs 11 engaged therein. A plurality of electric light sockets 12 and bulbs 13 is also mounted upon the wall 7 in the lower chamber 9. Rotatably mounted in each of the four corners of the upper box chamber 8 on a rod or spindle 14 is a vertical roller 15. The rods 14 project downwardly into the lower box chamber 9 and have rollers 16 rotatably engaged thereon.

Mounted within the casing 1 is a mechanism supporting frame comprising a bottom plate 17 and a top plate 18 connected to one another by channel uprights 19. Supported between the uprights 19 is a compound wound motor 20. Secured on the motor shaft 21 is a worm 22 which meshes with a pair of large worm wheels 23 and 24 to drive the same in opposite directions. The worm wheels 23 and 24 are respectively keyed or otherwise secured to upright shafts 25 and 26 which are journalled in bearing members 27 mounted on the frame plates 17 and 18 as illustrated in Figure 8.

Rigidly secured on each of the shafts 25 and 26 and directly above the respective worm wheels 23 and 24 is a clutch core 28 having a plurality of radial recesses therein for holding coiled springs 29. The coiled springs 29 press outwardly against a split friction ring 30 positioned within a clutch housing 31. Each clutch housing 31 has a plurality of radial grooves 32 in the top surface thereof. A similarly grooved clutch housing 33 is also secured on each of the shafts 25 and 26 below the worm wheels 23 and 24, and encloses a split friction ring 30 and a core member 28 similar to the construction illustrated in Figure 10. Rotatable upper spools or reels 34 and 35 are respectively mounted on the shafts 25 and 26 above the clutch housings 31 and are slidable longitudinally with respect to said shafts. The shank of each reel is slit at 36 as illustrated in Figure 5 to permit one end of a film or ribbon of silk or other suitable material to be connected with the reel. The bottom plate 37 of each of the upper reels 35 has struck downwardly therefrom resilient lugs or fingers 43 adapted to coact with the grooved clutch housings 31 to permit rotation of the reels on the shafts 25 and 26 in one direction only. An inclined flange 38 is integrally formed on the bottom plates 37 of each of the upper reels 34 and 35. A pair of lower spools or reels 40 and 41 are slidably and rotatably engaged on the respective shafts 25 and 26 between the worm wheels 23 and 24 and the lower clutch housings 33. The lower disk or plate 42 of each of the lower reels 40 and 41 is provided with a plurality of downwardly struck lugs or fingers 43 and with an inclined flange 44.

Pivotally mounted upon each of the frame uprights 19 are upper and lower arms 45 each provided with a friction tooth or lug 46. Each arm 45 is engaged by a spring 47 which acts to hold the friction lug 46 of said arm downwardly into frictional engagement with the inner surface of the respective inclined flanges 38 or 44 of the upper and lower reels to afford a brake load to keep the ribbons taut.

Supported by the frame plates 17 and 18 between and a little to the front of the shafts 25 and 26 is a rod or shaft 48. Secured near the lower end of the shaft 48 is a crank or arm 49, the outer end of which is tapered. The arm 49 projects between a pair of spring arms 50 supported in a U-shaped bracket 51 fixed on the lower frame plate 17. The crank arm 49 is positioned to coact with a control disk 52 fixed on the shaft 26 above the frame plate 17 as illustrated in Figure 8. The control disk 52 is provided with a plurality of peripheral V-shaped notches 53 spaced ninety degrees apart. Fixed on the shaft 48 at the level of the flanges 44 of the lower reels 40 and 41 is an arm 54 having a cross member 55 at the outer end. The ends of the cross member 55 are beveled to permit the same to be alternately projected under the inclined flanges 44 of the lower reels 40 and 41 to raise the same out of engagement with the driving clutches 33. Also fixed on the shaft 48 at the level of the inclined flanges 38 of the upper reels 34 and 35 is a collar 56 having a beveled cross member 57 thereon positioned to coact with the reel flanges 38 to permit shifting of the upper reels out of engagement with the upper clutch housings 31 when necessary.

For reversing the rotation of the motor 20, a triple pole double throw knife switch is mounted upon the lower frame plate 17 or in any other convenient position. The motor reversing switch comprises a base block 58 having mounted on the top thereof three brackets or posts 59, 60 and 61 on which are fulcrumed angled or bell-crank switch blades 62. Also mounted upon one end of the top surface of the switch block 58 are split blade receiving contact posts 63, 64 and 65. Split blade receiving contact posts 66, 67 and 68 are mounted upon the top of the other end of the switch block 58. Connecting the switch blades 62 on each side of the pivoted mounting thereof is a bar of insulating material 69 on the bottom of which is secured a metal conductor bar 70. The switch block 58 is provided with four cylindrical openings having solenoids 71 and 72 seated therein and provided respectively with slidable cores 73 and 74. The solenoids are arranged in pairs 71 and 72 on opposite sides of the transverse middle section of the switch block 58 and each solenoid has a lower stationary core member 75. The stationary core members 75 of each pair of solenoids are connected to one another by a metal bar 76 as illustrated in Figure 7. The slidable cores 73 and 74 are connected to the respective switch bars 69 by loops or links 77 to permit actuation of the switch blades 62.

Mounted upon the under side of the upper frame plate 18 are two binding posts 78 and 79 having pivotally mounted thereon switch control arms 80 and 81 respectively. A spring 82 is mounted on each post and engages the respective control arm to hold the same against the shank of the respective upper reels 34 and 35 which are grounded.

Attached to the slit portion of the upper reel 34 is one end of an upper tape, film or ribbon 83, the other end of which is secured to the upper reel 35. A lower tape, film or ribbon 84 has one end thereof attached to the lower reel 40 and the other end connected to the lower reel 41. Each of the ribbons 83 and 84 is provided with advertising words, symbols or characters 85 formed by perforating, stamping or painting the ribbons or applying the same in any other desired manner. A glass plate 86 is positioned in the display box 2 to close the openings 3 and 4 to protect the ribbons, said glass being colored to permit the ribbons to be visible only when illuminated.

Figure 11 is a wiring diagram of the device and includes a double pole signal throw line switch 118 having terminals 87, 88, 89 and 90. Line wires are adapted to be connected to the line switch terminals 87 and 88. A wire 91 has one end connected to the line switch terminal 89 and the other end connected to the lamps 11 and 13. A wire 92 is connected to the switch terminal 63 and to the lamps 11. Attached to the switch terminal 66 is one end of a wire 93, the other end of which is connected to the lamps 13. Connected to the switch terminal 64 is one end of a wire 94, the other end of which is connected to one of the brushes of the compound wound motor 20. Attached to the other brush of the motor 20 is one end of a wire 95, the other end of which is connected to the switch terminal 65. Connected to the line switch terminal 89 is one end of a wire 96, the other end of which is connected to one end of the motor shunt winding 97 and to one end of the motor series winding 98. Connected to the other end of the motor shunt winding 97 is one end of a wire 99, the other end being connected to the line switch terminal 90. One end of a wire 100 is connected to the second end of the motor series winding 98 while the other end of said wire 100 is connected to the motor reversing switch terminal 60. A wire 101 connects the line switch terminal 90 with the motor reversing switch terminal 61. The line switch terminal 90 is grounded at 102. Attached to the binding post 79 is one end of a wire 103, the other end being connected to one terminal 104 of one of the pair of solenoids 72. The coils of the solenoids 72 are connected in series by a wire 105. Connected to the solenoid terminal 106 is one end of a wire 107 having the other end connected to the line switch terminal 89. A wire 108 is also connected to the line switch terminal 89 and to the solenoid terminal 109 of the second set of solenoids 71. The coils of the solenoids 71 are connected in series by a wire 110. Connected to the solenoid terminal 111 is one end of a wire 112, the other end of which is connected to the terminal post 78. The reels 34 and 35 are grounded at 113 and 114 respectively. A wire 115 connects the line switch terminal 90 with the motor reversing switch terminal 59. The motor reversing switch terminals 64 and 68 are connected by a cross wire 116, while the switch terminals 65 and 67 are connected by a cross wire 117.

The operation is as follows:

The advertising machine is provided with upper and lower advertising films or ribbons 83 and 84 provided with advertising words, symbols or characters. The ribbons have the ends thereof attached to the respective reels. The upper ribbon 83 is trained to engage the upper guide rollers 15, as illustrated in Figure 5, so that the ribbon will travel across the upper box opening 3 as shown in Figure 3. The lower ribbon 84 is connected to the lower reels 40 and 41 and is trained to engage around the lower guide rolls 16 in the lower box chamber 9 and travel across the lower box opening 4. The upper ribbon 83 is adapted to be wound on one of the upper reels 34 or 35 as it is unwound from the other. The same is true with respect to the lower ribbon 84 and the lower reels 40 and 41. When the machine is operating, one of the ribbons is illuminated and travels across the front of the display box 2 in a direction to permit the words on the ribbon to be read consecutively while the other ribbon is not illuminated and moves in an opposite direction to be rewound on its feeding reel. The two ribbons are of substantially equal lengths so that when one ribbon starts to unwind from its feeding reel, the other ribbon starts to wind up upon its feeding reel. The feeding reels are the reels 35 and 41.

The motor reversing switch is positioned with the blades 62 thereof either engaged with the switch terminals 63, 64 and 65, as illustrated in Figure 4, or with the terminals 66, 67 and 68. With the motor reversing switch set with the blades 62 contacting the switch terminals 63, 64 and 65, the machine is started by closing the line switch 118. When the machine is started, the upper ribbon 83 is wound up upon the upper reel 34 from the reel 35 and the lower ribbon is unwound from the lower reel 40 back onto the lower feed reel 41. The two ribbons are of substantially equal lengths and are made of silk or other suitable material to afford an insulating or non-conducting medium between the reels 34 and 35 and the respective control arms 80 and 81.

With the upper ribbon completely wound up on the upper reel 35, the control arm 81 is held out of contact with the upper reel 35, thereby opening the circuit to the solenoids 72 and deenergizing the same. When this condition exists, the control arm 80 is in direct contact with the upper reel 34, thereby closing the circuit through the solenoids 71 which are energized and act to draw the solenoid cores 73 inwardly, thereby automatically operating the motor reversing switch to draw the switch blades 62 into contact with the switch terminals 63, 64 and 65 and simultaneously breaking the contact between the switch blades 62 and the switch terminals 66, 67 and 68. When the upper ribbon 83 is completely wound upon the upper reel 35, the lower ribbon 84 is completely wound upon the lower reel 40 ready to be rewound upon the lower reel 41.

As the switch blades 62 are pulled into contact with the switch terminals 63, 64 and 65, the motor is reversed and the circuit to the lower lamps 13 is broken while the circuit to the upper lamps 11 is established. The driving worm 22 on the motor shaft 21 is thus driven to rotate the worm wheels 23 and 24 in opposite directions whereby the upper ribbon 83 is wound upon the upper reel 34 and is fed across the upper box opening 3 in front of the burning lamps 11 which serve to illuminate the upper ribbon permitting the advertising matter thereon to be read as the ribbon moves from right to left across the box looking at Figure 3. As the upper illuminated ribbon 83 is wound upon the upper reel 34, the lower ribbon 84 which is not illuminated is simultaneously rewound upon the lower reel 41 back into normal position.

As soon as the upper ribbon 83 begins to wind upon the upper reel 34, the spring-controlled arm 80 is separated from contact with the reel 34 thereby breaking the circuit to the solenoids 71. The ribbons are made of insulating material to act as non-conductors between the arms 80 and 81 and the upper reels. When the end of the upper ribbon attached to the upper reel 35 is reached, the control arm 81, which is spring-impelled, automatically contacts the metal reel 35, thereby automatically closing the circuit to the solenoids 72. The solenoids 72 are thus energized and act to throw the reversing switch by pulling the switch blades 62 into contact with the switch terminals 66, 67 and 68 and breaking contact with the switch terminals 63, 64 and 65. The lower lamps 13 are thus lighted while the upper lamps 11 are extinguished. As the switch is thrown, the motor is reversed to permit the lower ribbon 84 to be fed across the lower box opening 4 in front of the burning lamps 13 to be unwound from the lower reel 41 and wound onto the lower reel 40. As the ribbon 84 is advanced, the upper ribbon is rewound upon the upper reel 35.

When the lower ribbon 84 has been completely wound upon the lower reel 40, the upper ribbon 83 being of substantially the same length, is completely wound upon the upper reel 35, thereby permitting the control arm 80 to be moved into contact with the reel 34 to again cause reversing of the motor 20.

To afford a brake mechanism to keep the ribbons taut, the spring-impelled brake arms 45 are held so that the lugs 46 thereof are held in frictional engagement with the inclined inner surfaces of the reel flanges 44.

The upper reels 34 and 35, and the lower reels 40 and 41 are arranged with the spring fingers 43 on the respective upper plates 37 and the lower plates 42 thereof directed in opposite directions to permit one of the reels of each horizontal pair to be driven by its respective grooved clutch housing 31 or 33, while the other reel of said pair is lifted out of the field of operation of its driving clutch and driven by the pull of the respective ribbon. For the purpose of lifting one of the reels of each pair out of engagement with its respective driving clutch, the spring-controlled arm 49 is provided on the auxiliary shaft 48 to coact with the notched disk 52 on the shaft 26 as shown in Figures 6 and 8. When the motor is operated in one direction to permit reading of the upper ribbon 83, the diagonally positioned upper and lower reels 34 and 41 are driven by their respective clutch mechanisms, while the remaining two upper and lower reels 35 and 40 are raised out of driving connection with their respective clutches by means of the bevelled upper and lower cross members 57 and 55 which respectively move into engagement with said reels 35 and 40 so that the bevelled portions of the respective ends of said cross members will slide under the inclined flanges 38 and 44 of said reels to cause the same to be slightly elevated on their respective shafts away from their driving clutches. The auxiliary shaft 48 on which the cross members 57 and 55 are supported is rotated by means of the notched disk 52 coacting with the spring-controlled arm 49. When the ribbons have been wound on the reels 34 and 41, the motor is automatically reversed and the reels 35 and 40 are permitted to drop into engagement with their driving clutches while the reels 34 and 41 are slightly elevated by the cross members 57 and 55, thereby eliminating the clicking action of the lugs or fingers 43 over the respective grooved clutch housings and permitting faster or slower rotation on the shafts 25 and 26 to compensate for the difference in diameters of the ribbons as they are wound and unwound.

To stop the operation of the advertising machine, it is only necessary to pull the line switch 118.

I am aware that numerous details of construction may be varied through a wide range without departing from the principles of this invention, and I therefore do not purpose limiting the patent granted, otherwise than necessitated by the scope of the appended claims.

I claim as my invention:

1. An advertising device comprising a plurality of advertising ribbons, reels for said ribbons, mechanisms for alternately moving the ribbons simultaneously in opposite directions, means for alternately illuminating said ribbons to permit the same to be read only when moving in the proper direction, and control members adapted to be separated from the reels by said ribbons and acting to engage said reels when the ends of the ribbons are reached to automatically cause reversing of the direction of travel of said ribbons.

2. An advertising device comprising a casing, a display box supported thereon having display openings therein, advertising ribbons within said box, means in said casing for moving said ribbons simultaneously across said openings in opposite directions to permit one of said ribbons to be read at a time, means for illuminating the ribbon to be read, and electrical contact members controlled by said ribbons adapted to automatically cause reversing of the direction of movement of said ribbons when either end of said ribbons is reached.

3. An advertising device comprising a casing, a display box supported thereon having display openings therein, advertising ribbons in said box, reels in said casing for moving said ribbons across the box in opposite directions, means for alternately illuminating the ribbons, a driving mechanism for said reels, and control members governing the driving mechanism and said illuminating means adapted to coact with said reels when the ends of said ribbons are reached to cause automatic reversing of said driving mechanism and a change in the illuminating means.

4. An advertising device comprising a casing, a box thereon having display openings therein, a plurality of advertising ribbons in said box, reels for said ribbons, illuminating means in said box for said ribbons, a driving device for said reels, a switch connected with said driving device and with said illuminating means, and control members governed by said ribbons adapted to coact with said reels when the ends of said ribbons are reached to cause automatic operation of the switch whereby the direction of drive of the driving device is reversed and a change in the lighting of the illuminating means is effected.

5. An advertising device comprising an advertising ribbon, a pair of shafts, grooved driving clutches engaged on said shafts, reels for said ribbon rotatably engaged on said shafts above the grooved clutches, spring fingers on said reels to coact with said grooved clutches to cause movement of said ribbon from one reel to the other, worm wheels secured on said shafts and connected with said clutches, a motor, a worm driven thereby to cause a drive to be imparted to said shafts, a reversing switch for the motor, and control members governed by the ribbon adapted to coact with said reels when either of the ends of said ribbon is reached to cause automatic operation of the switch and reversal of the motor.

6. An advertising device comprising an advertising ribbon, a pair of shafts, grooved driving clutches, worm wheels secured thereto and to said shafts, a motor for driving the same, reels for said ribbon rotatably engaged on said shaft above the grooved clutches, spring fingers on said reels to coact with said grooved clutches to cause movement of said ribbon from one reel to the other, an auxiliary shaft, a bevelled member thereon for coaction with said reels, an arm on said auxiliary shaft, a notched disk on one of said shafts adapted to actuate said arm whereby the bevelled member is moved to raise one of said reels out of engagement with its respective clutch and permitting the other reel to be driven by its clutch, and control members governed by the ribbon and adapted to coact with said reels when the ends of said ribbon are reached to cause automatic reversal of the motor and a reversal of travel of the ribbon.

7. In an advertising device the combination with a pair of main shafts, gear members thereon, a driving motor therefor, reels on said shafts, clutches between said gear members and said reels to drive the same, a ribbon having the ends thereof connected to said reels and adapted to be alternately wound upon said reels, an auxiliary shaft, a member thereon for coaction with said reels, mechanisms connecting said auxiliary shaft with one of said main shafts to cause said member to elevate one of said reels out of driving relation with its clutch while the other reel is driven by its clutch, and control members governed by the ribbon adapted to coact with the reels when the ends of the ribbon are reached to cause automatic reversal of the motor resulting in the lowering of the raised reel and the elevation of the other reel.

8. In an advertising device of the class described the combination with a pair of reels, of an advertising ribbon adapted to be alternately wound and unwound from said reels, clutch mechanisms for rotating said reels, and bevelled members for alternately shifting said reels out of driving engagement with the respective clutch mechanisms.

9. An advertising device comprising ribbons having advertising matter thereon, means for illuminating one of said ribbons at a time, reels on which said ribbons are adapted to be alternately wound and unwound, shafts on which said reels are rotatably engaged, resilient members on said reels, grooved driving clutches on said shafts to coact with said resilient members to cause rotation of said reels, brake members frictionally engaging said reels, worm wheels secured on said shafts and to said clutches, a motor, a driving worm secured on the motor shaft and meshing with said worm wheels to drive the same in opposite directions, a reversing switch connected with the motor, solenoids for operating said switch to cause reversing of the motor, means operated from the motor for alternately shifting the reels out of engagement with the driving clutches, and control members for the solenoids governed by the ribbons and adapted to contact said reels when the ends of the ribbons are reached to energize the solenoids to cause operation of the switch.

10. An advertising machine comprising a plurality of advertising ribbons, shiftable reels for said ribbons, inclined flanges formed on said reels, and bevelled members adapted to be rotated to engage said flanges at predetermined times to shift the reels.

11. An advertising machine comprising a plurality of advertising ribbons, a pair of shafts, driving clutch mechanisms mounted on said shafts, reels for said ribbons shiftably mounted on said shafts and adapted to be driven by said clutch mechanisms, and members adapted to shift said reels at predetermined times out of driving engagement with said clutch mechanisms.

In testimony whereof I have hereunto subscribed my name in the presence of two subscribing witnesses.

THOMAS R. WIWI.

Witnesses:
   FRED E. PAESLER,
   OSCAR HARTMANN.